No. 711,922. Patented Oct. 21, 1902.
R. F. CORNEIL.
SUPPORT FOR CYCLES.
(Application filed May 19, 1902.)
(No Model.) 3 Sheets—Sheet 3.
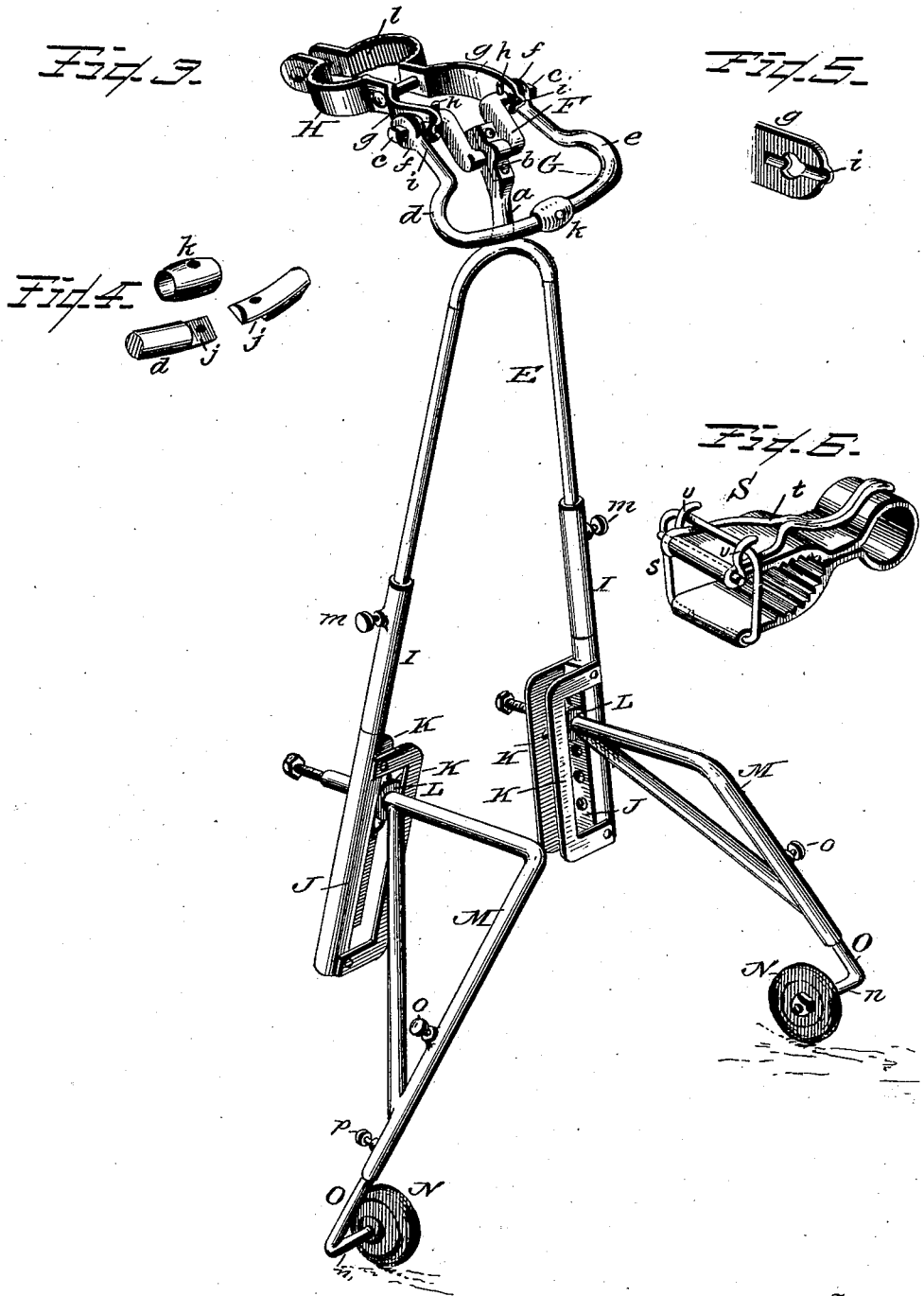
Witnesses
C. J. Williamson
M. E. Moore
Inventor
Robert F. Corneil
per Chas. H. Fowler
Attorney

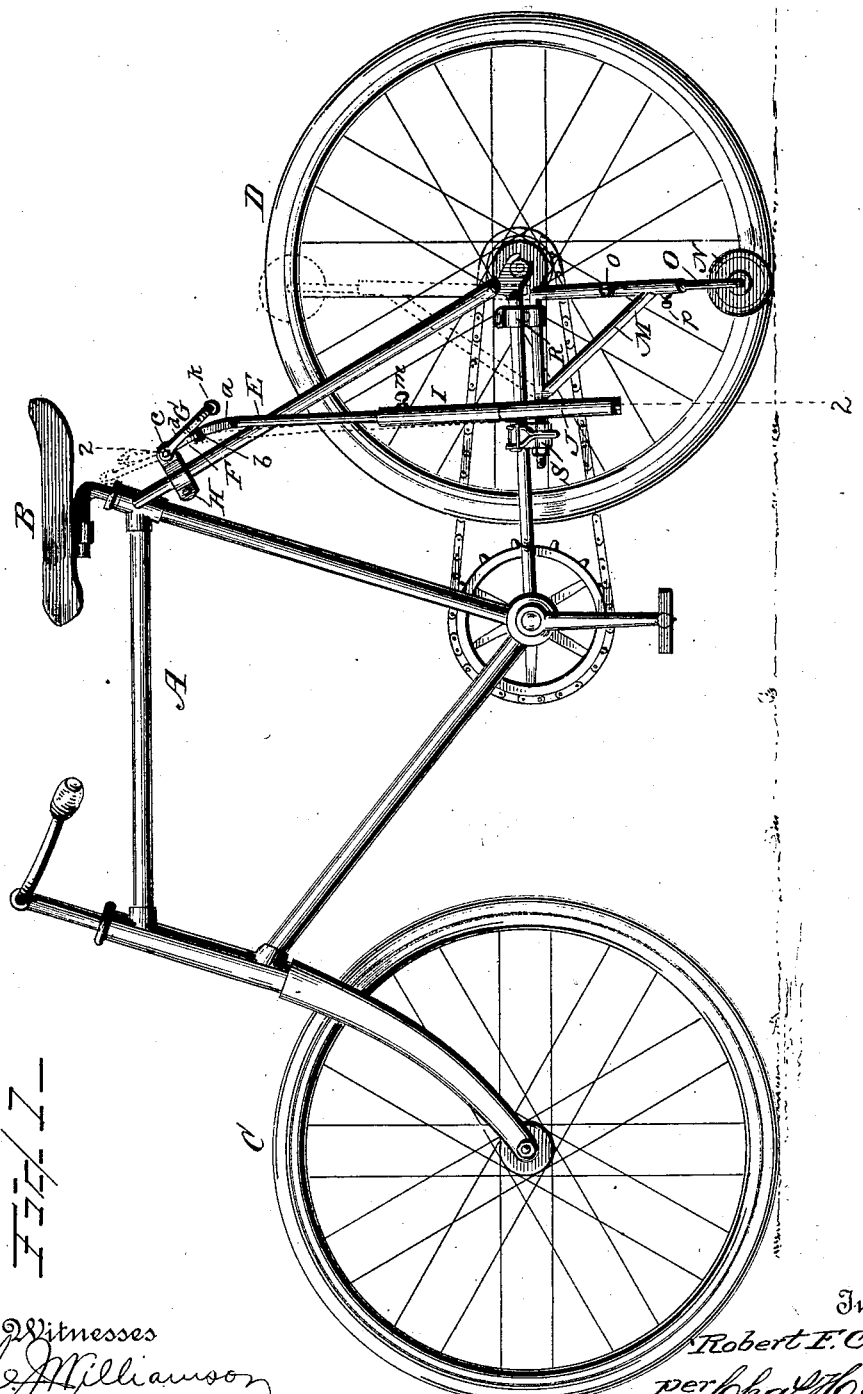

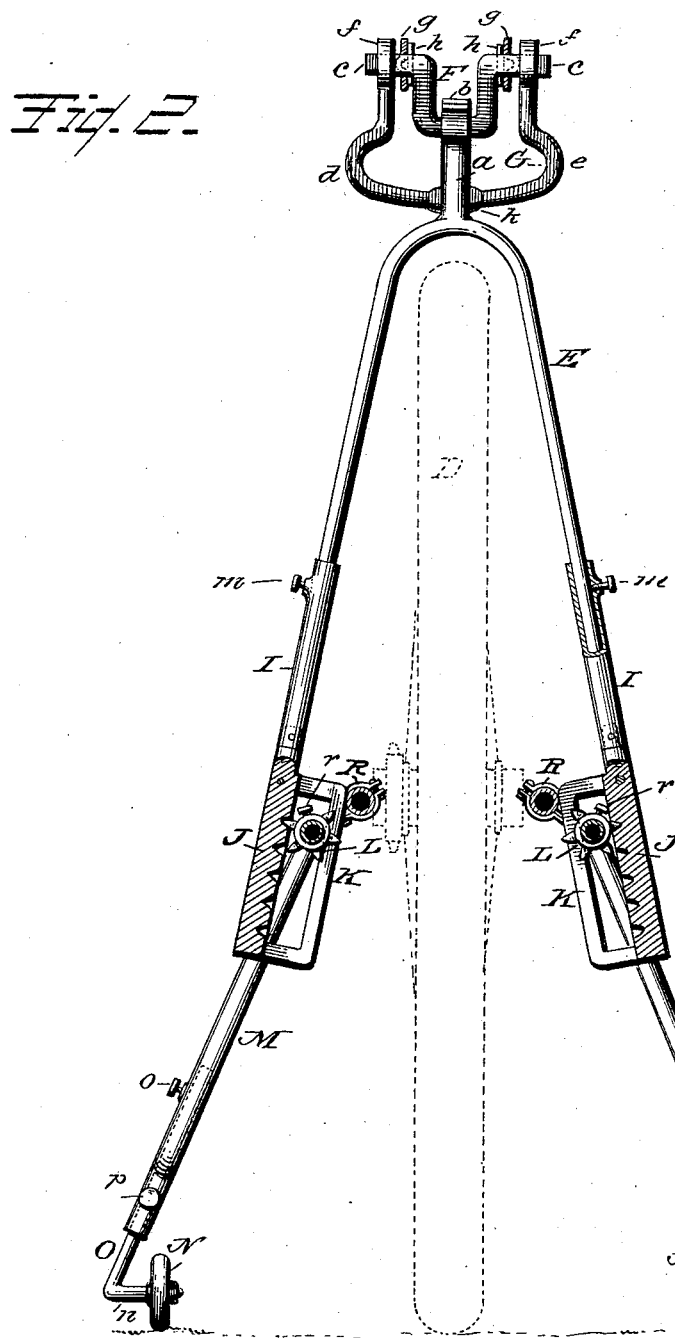

UNITED STATES PATENT OFFICE.

ROBERT F. CORNEIL, OF PHILLIPSBURG, MONTANA, ASSIGNOR OF ONE-FOURTH TO JOHN CHARLES MCLEOD, OF PHILLIPSBURG, MONTANA.

SUPPORT FOR CYCLES.

SPECIFICATION forming part of Letters Patent No. 711,922, dated October 21, 1902.

Application filed May 19, 1902. Serial No. 108,099. (No model.)

*To all whom it may concern:*

Be it known that I, ROBERT F. CORNEIL, a citizen of the United States, residing at Phillipsburg, in the county of Granite and State of Montana, have invented certain new and useful Improvements in Supports for Cycles; and I do hereby declare that the following is a full, clear, and exact description of the same, reference being had to the annexed drawings, making a part of this specification, and to the letters of reference marked thereon.

The present invention has relation to attachments for bicycles, motor-cycles, or other two-wheel conveyances in which the wheels are used tandem, such attachment being designed as a support for the vehicle when not in use to prevent the same from tipping over and when in use to serve as an aid to a beginner in retaining the vehicle in an upright position while in motion, thereby assisting the rider in maintaining his balance.

The invention consists in a support for bicycles or other like vehicles constructed substantially as shown in the drawings and hereinafter described and claimed.

Figure 1 of the drawings is a side elevation of a bicycle with my improved support connected thereto, said support being shown in operative position in full lines and swung up out of operative position in dotted lines; Fig. 2, a front elevation, partly in section and on an enlarged scale, said elevation being taken on line 2 2 of Fig. 1, the rear wheel of the bicycle being shown in dotted lines; Fig. 3, a perspective view of the support on an enlarged scale; Fig. 4, a detail perspective view showing the coupling ends of the clevis used to raise or lower the support and also the sleeve for connecting the coupling ends together; Fig. 5, a detail perspective view showing one of the grooved spring ends of the clip-arm to assist in holding the support in its adjusted position; Fig. 6, a detail perspective view of the clamp for securing the support to the frame of the bicycle.

In the accompanying drawings, A represents the frame of an ordinary bicycle, provided with the usual seat B, and C D are the front and rear wheels, respectively, all of which may be of the usual construction.

I have shown a bicycle to illustrate the application of my improved support; but it is evident that the support is equally applicable to motor-cycles and all classes of cycles or conveyances in which two wheels are employed and used tandem.

In describing the construction of my improved support E represents a suitable hanger, preferably of U shape, and is provided at its upper end with a coupling-rod $a$, to which is connected a double crank F by means of a clip $b$, as shown more clearly in Fig. 3 of the drawings. This hanger, double crank, and means employed for connecting the crank to the hanger may be variously modified or changed in the details of construction without in any manner departing from the principle of the invention. The double crank F is provided with flat-sided ends $c$ for connecting thereto a suitable clevis G, which clevis is formed in two sections $d\ e$ and provided with eyes $f$, having holes corresponding in form to the flat-sided ends of the double crank. The double crank F has its bearings in the ends of spring-arms $g$, projecting from a suitable clip H of any preferred construction as a means for connecting the U-shaped hanger E to the frame of the bicycle or other two-wheel conveyance, as shown in Fig. 1 of the drawings. The journal ends of the double crank F have suitable keys $h$, which act, in conjunction with the grooves $i$ in the ends of the spring-arms $g$, to hold the support up out of operative position, as shown in dotted lines of Fig. 1 of the drawings.

When the support is raised up and out of the way or not required for use, by means of the clevis G the double crank F is turned, and the keys $h$ will press outward the spring ends of the arms $g$ and seat themselves in the grooves $i$, which will lock the double crank stationary and the support in its adjusted position, the pressure of the spring-arms against the keys holding the crank against turning. The two sections $d\ e$ of the clevis G upon their inner ends are reduced in thickness upon their opposite sides, as shown at $j$, so that when together the reduced ends will overlap each other and a suitable sleeve $k$ hold them together, as shown in Fig. 4 of the drawings.

Any suitable form of clevis G may be employed and any well-known means may be resorted to for coupling the two sections together, and any form of clip H or any suitable device may be used that will serve to attach the U-shaped hanger E to the frame of the bicycle or other similar vehicle, that shown being one of many forms of clips that may be employed, and, if desired, its inner surface may be serrated, as shown at $l$, to more securely hold the clip to the frame, as shown in Fig. 3 of the drawings.

The lower ends of the hanger E have adjustably connected thereto the tubular arms I and are held on the ends of the hanger in their adjusted position by set-screws $m$ or by any other suitable and well-known means. This means of adjustment will enable the support to be adapted to any size of frame of bicycle or adjusted in its height as circumstances may require. Upon the lower ends of the arms I are suitable racks J, provided with double guide-frames K, and engaging with these racks are suitable pinions L, rigidly connected to supporting-frames M, which pinions are located between the double guide-frames K to retain them in line with the racks. The racks, the pinions, and the supporting-frames may be of any preferred construction, said frames supporting the small wheels N, which are suitably journaled upon the inwardly-extending ends $n$ of arms O. The arms O are adjustably connected to the frames M in any well-known and preferred manner; but in the present instance I have shown the arms engaging the tubular portions of the frame and held in their adjusted position by the set-screws $o$ $p$. By means of this adjustment the wheels N may be raised or lowered with relation to the frame M and also adjusted laterally in a horizontal direction, as found desirable, the wheels being capable of adjustment both vertically and horizontally, and in providing for these adjustments any suitable means may be employed. The pinions L are rigidly held on the frames M by means of set-screws $r$ or other suitable fastenings that will prevent the wheels from turning on the frame. The supporting-frames M are pivotally or otherwise suitably connected to the rods P of the bicycle-frame by means of the clips R and the clamps S, which clips and clamps may be of any suitable construction found best adapted to the purpose. I prefer, however, that the clamps S be of the construction shown in Fig. 6 of the drawings, and in place of using the usual screw-bolts and nuts for securing it to the bicycle-frame to provide a pivoted link $s$ and a lever $t$ with hooked ends $u$ for engaging the link, as shown in the drawings. This construction is one of many that may be employed in securing the clamp to the bicycle-frame, and I do not desire to limit my invention to any special form of clamp or clip, and any changes in the several details of construction in the various parts comprising the support may be made without in any manner departing from the essential features of the invention.

The U-shaped hanger E connects with the supporting-frames M through the medium of the racks J and the pinions L, which racks are connected with the hangers by means of the tubular arms I, and by raising the hanger the racks will also be raised. As the racks are elevated the pinions will be turned and the supporting-frames be swung up out of the way, as shown in dotted lines of Fig. 1 of the drawings.

Having now fully described my invention, what I claim as new, and desire to secure by Letters Patent, is—

1. A support for cycles comprising a suitable hanger, means for connecting the hanger with the frame of the cycle, means for raising the hanger and locking it in its raised position, racks provided with tubular arms, the hangers adjustably connected to the arms, supporting-frames pivotally connected to the frame of the cycle, wheels adjustably connected to the supporting-frames, pinions rigidly connected to the supporting-frames and engaging the racks, substantially as and for the purpose specified.

2. A support for cycles comprising a suitable clip for connecting with the frame of the cycle and provided with spring-arms and locking-grooves upon the inner sides thereof, a double crank having its bearings in the spring-arms and provided with keys for engaging the grooves in the spring-arms, a suitable clevis connecting with the crank for operating it, a hanger connecting with the crank, racks with double guide-frames connecting with the hanger, supporting-frames pivotally connecting with the frame of the cycle, wheels upon the supporting-frames, and pinions rigidly connected to the supporting-frames and engaging the racks, substantially as and for the purpose described.

In testimony that I claim the above I have hereunto subscribed my name in the presence of two witnesses.

ROBERT F. CORNEIL.

Witnesses:
A. A. FAIRBAIRN,
E. H. CAMPBELL.